(12) United States Patent
Wang

(10) Patent No.: US 10,996,794 B2
(45) Date of Patent: May 4, 2021

(54) METHOD AND APPARATUS FOR PROCESSING EDGE OF TOUCH SCREEN

(71) Applicant: ZTE CORPORATION, Guangdong (CN)

(72) Inventor: Jianping Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/632,848

(22) PCT Filed: Oct. 24, 2017

(86) PCT No.: PCT/CN2017/107465
§ 371 (c)(1),
(2) Date: Jan. 21, 2020

(87) PCT Pub. No.: WO2019/019440
PCT Pub. Date: Jan. 31, 2019

(65) Prior Publication Data
US 2020/0150820 A1 May 14, 2020

(30) Foreign Application Priority Data
Jul. 25, 2017 (CN) .......................... 201710612486.8

(51) Int. Cl.
*G06F 3/041* (2006.01)
*G06F 1/16* (2006.01)
(Continued)

(52) U.S. Cl.
CPC ........ *G06F 3/04186* (2019.05); *G06F 1/1643* (2013.01); *G06F 1/1647* (2013.01);
(Continued)

(58) Field of Classification Search
CPC .. G06F 3/04186; G06F 3/0412; G06F 3/0488; G06F 3/1446; G06F 1/1643; G06F 1/1647
(Continued)

(56) References Cited

U.S. PATENT DOCUMENTS 5,703,623 A * 12/1997 Hall ...................... G06F 3/0346
345/156
10,884,611 B2 * 1/2021 Zhang ................. G06F 3/04886
(Continued)

FOREIGN PATENT DOCUMENTS

| CN | 103995668 A | 8/2014 |
| CN | 105700709 A | 6/2016 |

(Continued)

OTHER PUBLICATIONS

International Search Report for the International Patent Application No. PCT/CN2017/107465, dated Apr. 17, 2018, 3 pages.
(Continued)

*Primary Examiner* — Prabodh M Dharia
(74) *Attorney, Agent, or Firm* — Kacvinsky Daisak Bluni PLLC

(57) ABSTRACT

A method includes: detecting a current portrait or landscape state of a touch screen of a mobile terminal; determining that edge suppression is performed or no edge suppression is performed on an edge of the touch screen according to the portrait or landscape state of the mobile terminal; setting an edge suppression function of the touch screen according to a determination result, thereby solving the problem in the related art that that screen edge suppression of a touch screen of a mobile terminal is not flexible enough, flexibly setting a screen edge suppression function of the touch screen of the mobile terminal, and improving use convenience and user experience.

19 Claims, 9 Drawing Sheets

(51) Int. Cl.
*G06F 3/0488* (2013.01)
*G06F 3/14* (2006.01)

(52) U.S. Cl.
CPC .......... *G06F 3/0412* (2013.01); *G06F 3/0488* (2013.01); *G06F 3/1446* (2013.01); *G06F 2200/1614* (2013.01)

(58) Field of Classification Search
USPC ................................ 345/156, 157, 173, 174
See application file for complete search history.

(56) References Cited

U.S. PATENT DOCUMENTS

| | | | |
|---|---|---|---|
| 2011/0237303 A1* | 9/2011 | Matsuda | G06F 3/0485 455/566 |
| 2013/0285956 A1 | 10/2013 | Kamii et al. | |
| 2017/0177034 A1* | 6/2017 | North | G06F 1/1652 |
| 2017/0224140 A1* | 8/2017 | Vertegaal | G06F 1/1601 |
| 2020/0409548 A1* | 12/2020 | Irvine | G06F 3/0414 |

FOREIGN PATENT DOCUMENTS

| | | | |
|---|---|---|---|
| CN | 106708263 | * 12/2016 | .............. G06F 3/011 |
| CN | 106681638 A | 5/2017 | |
| CN | 106708263 A | 5/2017 | |
| CN | 106855785 A | 6/2017 | |
| EP | 3062200 A1 | 8/2016 | |
| JP | 2012508405 A | 4/2012 | |
| JP | 2012248137 A | 12/2012 | |
| JP | 2013228836 A | 11/2013 | |
| JP | 2013545168 A | 12/2013 | |

OTHER PUBLICATIONS

Office Action for Japanese Application No. 2020-50261, dated Feb. 2, 2021, 6 pages.

* cited by examiner

METHOD AND APPARATUS FOR PROCESSING EDGE OF TOUCH SCREEN

CROSS-REFERENCE TO RELATED APPLICATIONS

This is a U.S. National Stage Application, filed under 35 U.S.C. 371, of International Patent Application No. PCT/CN2017/107463, filed on Oct. 24, 2017, which claims priority to Chinese patent application No. 201710612486.8 filed on Jul. 25, 2017, contents of both of which are incorporated herein by reference in their entireties.

TECHNICAL FIELD

The present disclosure relates to the field of communications and, in particular, to a method and apparatus for processing an edge of a touch screen.

BACKGROUND

Portable electronic apparatuses such as smart phones are widely applied, and the smart phones are generally provided with a touch screen as an input device. Most smart phones currently use capacitive touch screens, which provide users with better experience.

At present, a screen size of the touch screen of a mobile phone is generally more than 5 inches, and some mobile phones have a screen size of 6.0 inches or even larger. FIG. 1 is a schematic diagram of controlling a touch screen with a thumb crossing a screen in the related art. As shown in FIG. 1, when the mobile phone is used with a single hand, for example, the mobile phone is held by a right hand and the thumb needs to cross the screen to click the content on a left side of the screen, the thumb and/or a thenar region (a part where the thumb is connected to a palm, indicated by A in FIG. 1 and hereinafter simply referred to as the thenar region) at the base of the thumb often touches a right side of the screen and the content thereof, resulting in a false touch. As a result, a point desired to be clicked has not been clicked yet, and a point not desired to be clicked is clicked instead, so that a result not desired by a user occurs.

FIG. 2 is a schematic diagram of a single-screen mobile terminal in the related art. As shown in FIG. 2, since a false edge touch often occurs when the mobile phone with a large screen is operated by a single hand, a part of users simply give up the single-hand operation and have to use another hand to touch a left region. The existing solution is to increase edge suppression of the touch screen. In order to solve the problem of the false edge touch during an operation of the existing touch screen, an edge suppression function is added on edges of the existing touch screen, and a rectangular edge part filled with oblique lines is an edge suppression region.

However, during an operation on a single landscape screen, the rectangular edge suppression region existing at the bottom in FIG. 2 will cause a difficulty in touching a bottom edge, so that a normal operation such as a touch or a click is suppressed and there is no response to the touch, seriously affecting user experience.

For a double-screen mobile phone, FIG. 3 is a first schematic diagram of a cross-screen operation on a double-screen mobile phone in the related art. As shown in FIG. 3, during the cross-screen operation, a left edge of a left screen and a right edge of a right screen are suppressed; when the double-screen mobile phone is operated in a double-screen portrait state, a disconnection and a stuttering are felt apparently in a sliding process.

FIG. 4 is a second schematic diagram of a cross-screen operation on a double-screen mobile phone in the related art. As shown in FIG. 4, when the double-screen mobile phone is operated in a double-screen landscape state, in response to a slide from top to bottom and a click on a top edge or a bottom edge, the bottom edge is difficult to touch, the normal operation such as the touch or the click is suppressed and there is no response to touches.

No solution is provided for the problem in the related art that screen edge suppression of the touch screen of the mobile terminal is not flexible enough.

SUMMARY

Embodiments of the present disclosure provide a method and apparatus for processing an edge of a touch screen, to solve at least the problem in the related art that screen edge suppression of a touch screen of a mobile terminal is not flexible enough.

According to an embodiment of the present disclosure, a method for processing an edge of a touch screen is provided. The method includes steps described below.

A current portrait or landscape state of a touch screen of a mobile terminal is detected.

It is determined according to the portrait or landscape state of the mobile terminal that edge suppression is performed or no edge suppression is performed on the edge of the touch screen.

An edge suppression function of the touch screen is set according to a determination result.

Optionally, the step of determining according to the portrait or landscape state of the mobile terminal that the edge suppression is performed or no edge suppression is performed on the edge of the touch screen includes steps described below.

When the mobile terminal is in the portrait state, it is determined that the edge suppression is performed on a left edge and a right edge of the touch screen.

When the mobile terminal is in the landscape state, it is determined that no edge suppression is performed on the edge of the touch screen.

Optionally, the step of determining that the edge suppression is performed on the left edge and the right edge of the touch screen when the mobile terminal is in the portrait state includes at least one of steps described below.

When the mobile terminal is in a single-screen portrait state, it is determined that the edge suppression is performed on the left edge and the right edge of the touch screen.

When the mobile terminal is in a double-screen or multi-screen expansion portrait state, it is determined that the edge suppression is performed on the left edge and the right edge of the touch screen and no edge suppression is performed between adjacent display screens.

Optionally, the step of determining that the edge suppression is performed on the left edge and the right edge of the touch screen and no edge suppression is performed between the adjacent display screens when the mobile terminal is in the double-screen or multi-screen expansion portrait state includes a step described below.

When the mobile terminal is in the double-screen expansion portrait state, it is determined that the edge suppression is performed on a left edge of a left touch screen and a right edge of a right touch screen and no edge suppression is performed on a right edge of the left touch screen and a left edge of the right touch screen.

Alternatively, when the mobile terminal is in the multi-screen expansion portrait state, it is determined that the edge suppression is performed on a left edge of a leftmost touch screen and a right edge of a rightmost touch screen and no edge suppression is performed on a right edge of the leftmost touch screen, left and right edges of a middle screen and a left edge of the rightmost touch screen.

Optionally, the step of setting the edge suppression function of the touch screen according to the determination result includes steps described below.

When the mobile terminal is in the single-screen portrait state, a touch screen configuration file for performing the edge suppression on the left edge and the right edge is sent through an inter-integrated circuit (I2C) or a serial peripheral interface (SPI) bus to the touch screen.

When the mobile terminal is in the double-screen or multi-screen expansion portrait state, a touch screen configuration file for performing the edge suppression on the left edge and the right edge and performing no edge suppression between the adjacent display screens is sent through the I2C or the SPI bus to the touch screen.

Optionally, the step of determining that no edge suppression is performed on the edge of the touch screen when the mobile terminal is in the landscape state includes steps described below.

When the mobile terminal is in a single-screen landscape state, it is determined that no edge suppression is performed on the edge of the touch screen.

When the mobile terminal is in a double-screen or multi-screen expansion landscape state, it is determined that no edge suppression is performed on the edge of the touch screen and no edge suppression is performed between adjacent display screens.

Optionally, the step of setting the edge suppression function of the touch screen according to the determination result includes steps described below.

When the mobile terminal is in the single-screen landscape state, a touch screen configuration file for performing no edge suppression is sent through an I2C or an SPI bus to the touch screen.

When the mobile terminal is in the double-screen or multi-screen expansion landscape state, a touch screen configuration file for performing no edge suppression on the edge of the touch screen and no edge suppression between the adjacent display screens is sent through the I2C or the SPI bus to the touch screen.

Optionally, the method further includes steps described below.

The touch screen configuration file is read from a memory.

The read touch screen configuration file is sent through the I2C or the SPI bus to an integrated circuit (IC) of the touch screen.

Optionally, the method further includes steps described below.

It is detected whether a state of the touch screen of the mobile terminal changes.

In a case where the state of the touch screen of the mobile terminal changes, an edge suppression region of the touch screen of the mobile terminal is changed according to a change condition of the state of the touch screen.

Optionally, the step of changing the edge suppression region of the touch screen of the mobile terminal according to the change condition of the state of the touch screen includes a step described below.

In response to detecting that the touch screen changes from the portrait state to the landscape state, an edge suppression state of the touch screen is switched from the left edge and right edge suppression to no edge suppression.

Alternatively, in response to detecting that the touch screen changes from the landscape state to the portrait state, an edge suppression state of the touch screen is switched from no edge suppression to the left edge and right edge suppression.

Optionally, the step of switching the edge suppression state of the touch screen from the left edge and right edge suppression to no edge suppression in response to detecting that the touch screen changes from the portrait state to the landscape state includes steps described below.

In response to detecting that the touch screen changes from the single-screen portrait state to the single-screen landscape state, the edge suppression state of the touch screen is switched from the left edge and right edge suppression to no edge suppression.

In response to detecting that the touch screen changes from the double-screen or multi-screen portrait state to the double-screen or multi-screen landscape state, the edge suppression state of the touch screen is switched from a state in which the edge suppression is performed on the left edge and the right edge and no edge suppression is performed between the adjacent display screens to no edge suppression.

Optionally, the step of switching the edge suppression state of the touch screen from no edge suppression to the left edge and right edge suppression in response to detecting that the touch screen changes from the landscape state to the portrait state includes steps described below.

In response to detecting that the touch screen changes from the single-screen landscape state to the single-screen portrait state, the edge suppression state of the touch screen is switched from no edge suppression to the left edge and right edge suppression.

In response to detecting that the touch screen changes from the double-screen or multi-screen landscape state to the double-screen or multi-screen portrait state, the edge suppression state of the touch screen is switched from no edge suppression to the state in which the edge suppression is performed on the left edge and the right edge and no edge suppression is performed between the adjacent display screens.

Optionally, the method further includes steps described below.

When the touch screen is in a double-screen or multi-screen state, a sliding instruction for sliding from a first display screen of the touch screen to an adjacent second display screen is detected.

Reporting of a DOWN event of the first display screen and an UP event of the second display screen is triggered by the sliding instruction, where no edge suppression is performed between the first display screen and the second display screen.

Optionally, the step of detecting the current portrait or landscape state of the touch screen of the mobile terminal includes steps described below.

For a single-screen mobile terminal, the current portrait or landscape state of the mobile terminal is detected through a three-axis acceleration sensor.

For a double-screen or multi-screen mobile terminal, a portrait or landscape state of the double-screen or multi-screen mobile terminal is determined through Hall device automatic detection or a function key switching manner.

According to another embodiment of the present disclosure, an apparatus for processing an edge of a touch screen is further provided. The apparatus includes a detection module, a determination module and a setting module.

The detection module is configured to detect a current portrait or landscape state of a touch screen of a mobile terminal.

The determination module is configured to determine according to the portrait or landscape state of the mobile terminal that edge suppression is performed or no edge suppression is performed on the edge of the touch screen.

The setting module is configured to set an edge suppression function of the touch screen according to the determination result.

Optionally, the determination module includes a first determination unit and a second determination unit.

The first determination unit is configured to: when the mobile terminal is in the portrait state, determine that the edge suppression is performed on a left edge and a right edge of the touch screen.

The second determination unit is configured to: when the mobile terminal is in the landscape state, determine that no edge suppression is performed on the edge of the touch screen.

Optionally, the first determination unit includes at least one of: a first determination sub-module or a second determination sub-module.

The first determination sub-module is configured to: when the mobile terminal is in a single-screen portrait state, determine that the edge suppression is performed on the left edge and the right edge of the touch screen.

The second determination sub-module is configured to: when the mobile terminal is in a double-screen or multi-screen expansion portrait state, determine that the edge suppression is performed on the left edge and the right edge of the touch screen and no edge suppression is performed between adjacent display screens.

Optionally, the second determination sub-unit is further configured to perform a step described below.

When the mobile terminal is in the double-screen expansion portrait state, it is determined that the edge suppression is performed on a left edge of a left touch screen and a right edge of a right touch screen and no edge suppression is performed on a right edge of the left touch screen and a left edge of the right touch screen.

Alternatively, when the mobile terminal is in the multi-screen expansion portrait state, it is determined that the edge suppression is performed on a left edge of a leftmost touch screen and a right edge of a rightmost touch screen and no edge suppression is performed on a right edge of the leftmost touch screen, left and right edges of a middle screen and a left edge of the rightmost touch screen.

Optionally, the setting module includes a first sending unit and a second sending unit.

The first sending unit is configured to: when the mobile terminal is in the single-screen portrait state, send a touch screen configuration file for performing the edge suppression on the left edge and the right edge to the touch screen through an I2C or an SPI bus.

The second sending unit is configured to: when the mobile terminal is in the double-screen or multi-screen expansion portrait state, send a touch screen configuration file for performing the edge suppression on the left edge and the right edge and performing no edge suppression between the adjacent display screens to the touch screen through the I2C or the SPI bus.

Optionally, the second determination unit includes a third determination sub-unit and a fourth determination sub-unit.

The third determination sub-unit is configured to: when the mobile terminal is in a single-screen landscape state, determine that no edge suppression is performed on the edge of the touch screen.

The fourth determination sub-unit is configured to: when the mobile terminal is in a double-screen or multi-screen expansion landscape state, determine that no edge suppression is performed on the edge of the touch screen and no edge suppression is performed between adjacent display screens.

Optionally, the setting module includes a third sending unit and a fourth sending unit.

The third sending unit is configured to: when the mobile terminal is in the single-screen landscape state, send a touch screen configuration file for performing no edge suppression to the touch screen through an I2C or an SPI bus.

The fourth sending unit is configured to: when the mobile terminal is in the double-screen or multi-screen expansion landscape state, send a touch screen configuration file for performing no edge suppression on the edge of the touch screen and performing no edge suppression between the adjacent display screens to the touch screen through the I2C or the SPI bus.

Optionally, the apparatus further includes an acquisition unit and a fifth sending unit.

The acquisition unit is configured to read the touch screen configuration file from a memory.

The fifth sending unit is configured to send the read touch screen configuration file to an IC of the touch screen through the I2C or the SPI bus.

Optionally, the apparatus further includes a change module.

The detection module is configured to detect whether a state of the touch screen of the mobile terminal changes.

The change module is configured to: in a case where the state of the touch screen of the mobile terminal changes, change an edge suppression region of the touch screen of the mobile terminal according to a change condition of the state of the touch screen.

Optionally, the change module includes a first switching unit or a second switching unit.

The first switching unit is configured to: in response to detecting that the touch screen changes from the portrait state to the landscape state, switch an edge suppression state of the touch screen from the left edge and right edge suppression to no edge suppression.

The second switching unit is configured to: in response to detecting that the touch screen changes from the landscape state to the portrait state, switch an edge suppression state of the touch screen from no edge suppression to the left edge and right edge suppression.

Optionally, the first switching unit is further configured to perform steps described below.

In response to detecting that the touch screen changes from the single-screen portrait state to the single-screen landscape state, the edge suppression state of the touch screen is switched from the left edge and right edge suppression to no edge suppression.

In response to detecting that the touch screen changes from the double-screen or multi-screen portrait state to the double-screen or multi-screen landscape state, the edge suppression state of the touch screen is switched from a state in which the edge suppression is performed on the left edge and the right edge and no edge suppression is performed between the adjacent display screens to no edge suppression.

Optionally, the second switching unit is further configured to perform steps described below.

In response to detecting that the touch screen changes from the single-screen landscape state to the single-screen portrait state, the edge suppression state of the touch screen is switched from no edge suppression to the left edge and right edge suppression.

In response to detecting that the touch screen changes from the double-screen or multi-screen landscape state to the double-screen or multi-screen portrait state, the edge suppression state of the touch screen is switched from no edge suppression to the state in which the edge suppression is performed on the left edge and the right edge and no edge suppression is performed between the adjacent display screens.

Optionally, the apparatus further includes a detection unit and a reporting unit.

The detection unit is configured to: when the touch screen is in a double-screen or multi-screen state, detect a sliding instruction for sliding from a first display screen of the touch screen to an adjacent second display screen.

The reporting unit is configured to report a DOWN event of the first display screen and an UP event of the second display screen in response to being triggered by the sliding instruction, where no edge suppression is performed between the first display screen and the second display screen.

Optionally, the detection module is further configured to perform steps described below.

For a single-screen mobile terminal, the current portrait or landscape state of the mobile terminal is detected through a three-axis acceleration sensor.

For a double-screen or multi-screen mobile terminal, a portrait or landscape state of the double-screen or multi-screen mobile terminal is determined through Hall device automatic detection or a function key switching manner.

According to another embodiment of the present disclosure, a storage medium is further provided. The storage medium includes stored programs which, when executed, perform the method according to any one of the embodiments described above.

According to another embodiment of the present disclosure, a processor is further provided. The processor is configured to execute programs, which, when executed, perform the method according to any one of the embodiments described above.

In the present disclosure, a current portrait or landscape state of a touch screen of a mobile terminal is detected, whether to perform edge suppression or not to perform edge suppression on an edge of the touch screen is determined according to the portrait or landscape state of the mobile terminal, and an edge suppression function of the touch screen is set according to the determination result, thereby solving the problem in the related art that that screen edge suppression of a touch screen of a mobile terminal is not flexible enough, flexibly setting a screen edge suppression function of the touch screen of the mobile terminal, and improving use convenience and user experience.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment One

Figure 1:
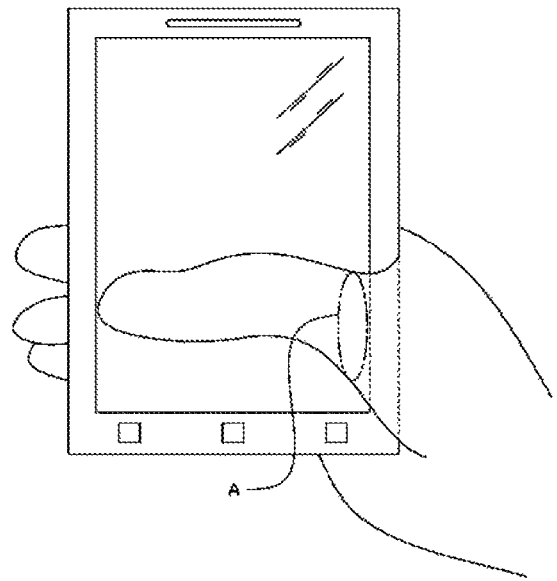
FIG. 1 is a schematic diagram of controlling a touch screen with a thumb crossing a screen in the related art.
Figure 2:
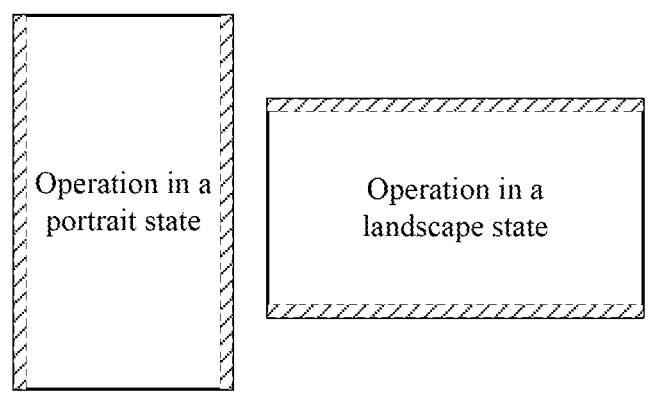
FIG. 2 is a schematic diagram of a single-screen mobile terminal in the related art.
Figure 3:
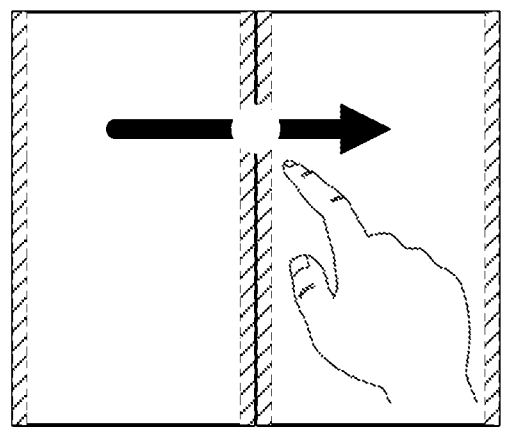
FIG. 3 is a first schematic diagram of a cross-screen operation on a double-screen mobile phone in the related art.
Figure 4:
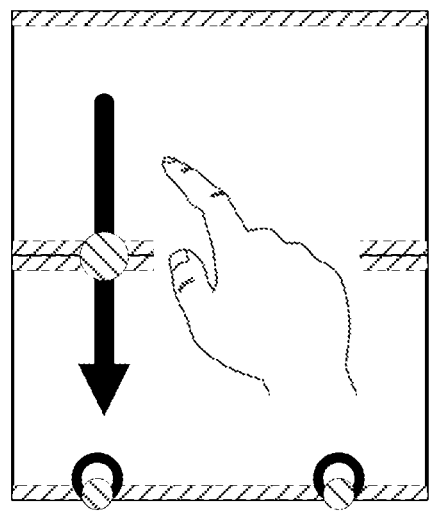
FIG. 4 is a second schematic diagram of a cross-screen operation on a double-screen mobile phone in the related art.
Figure 5:
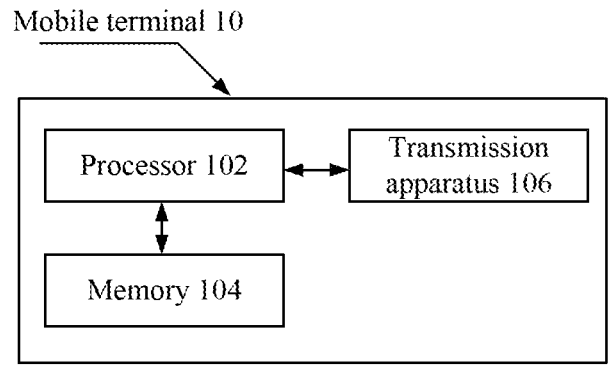
FIG. 5 is a block diagram of hardware of a mobile terminal according to an embodiment of the present disclosure.

A method embodiment provided by the embodiment one of the present application may be executed in a mobile terminal, a computer terminal or other similar computing apparatuses. Taking the method to be executed in the mobile terminal as an example, FIG. 5 is a block diagram of hardware of a mobile terminal according to an embodiment of the present disclosure. As shown in FIG. 5, a mobile terminal 10 may include one or two (only one is shown in FIG. 5) processors 102 (the processor 102 may include, but is not limited to, a processing apparatus such as a micro controller unit (MCU) or a field programmable gate array (FPGA)), a memory 104 used for storing data, and a transmission apparatus 106 used for implementing a communication function. It should be understood by those skilled in the art that the structure shown in FIG. 5 is merely illustrative and not intended to limit the structure of the electronic apparatus described above. For example, the mobile terminal 10 may further include more or fewer components than the components shown in FIG. 5 or may have a configuration different from the configuration shown in FIG. 5.

The memory 104 may be used for storing software programs and modules of application software, such as program instructions/modules corresponding to a set-top box connected to DHCP in the embodiments of the present disclosure. The processor 102 executes the software programs and modules stored in the memory 104 so as to perform various functional applications and data processing, that is, to implement the method described above. The memory 104 may include a high-speed random access memory, and may further include a nonvolatile memory such as one or two magnetic storage apparatuses, flash memories or other nonvolatile solid-state memories. In some examples, the memory 104 may include memories which are remotely disposed with respect to the processor 102 and these remote memories may be connected to the mobile terminal 10 via a network. Examples of the above network include, but are not limited to, the Internet, an intranet, a local area network, a mobile communication network and a combination thereof.

The transmission apparatus 106 is configured to receive or send data via a network. Specific examples of the above network may include a wireless network provided by a communication provider of the mobile terminal 10. In one example, the transmission apparatus 106 includes a network interface controller (NIC), which may be connected to another network device via a base station and thus be capable of communicating with the Internet. In one example, the transmission apparatus 106 may be a Radio Frequency (RF) module, which is used for communicating with the Internet in a wireless manner.

Figure 6:
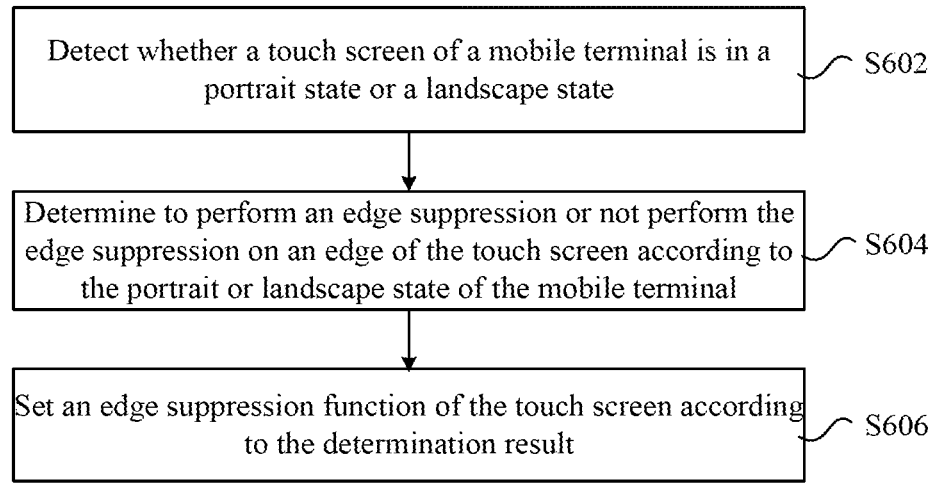
FIG. 6 is a flowchart of a method for processing an edge of a touch screen according to an embodiment of the present disclosure.

Based on the above mobile terminal, the present embodiment provides a method for processing an edge of a touch screen. FIG. 6 is a flowchart of a method for processing an edge of a touch screen according to an embodiment of the present disclosure. As shown in FIG. 6, the method includes step described below.

In step S602, a current portrait or landscape state of a touch screen of a mobile terminal is detected.

In step S604, whether to perform edge suppression or not to perform edge suppression on the edge of the touch screen is determined according to the portrait or landscape state of the mobile terminal.

In step S606, an edge suppression function of the touch screen is set according to a determination result.

Through the above-mentioned steps, the current portrait or landscape state of the touch screen of the mobile terminal is detected, it is determined according to the portrait or landscape state of the mobile terminal that the edge suppression is performed or no edge suppression is performed on the edge of the touch screen, and the edge suppression function of the touch screen is set according to the determination result, thereby solving the problem in the related art that screen edge suppression of a touch screen of a mobile terminal is not flexible enough, flexibly setting a screen edge suppression function of the touch screen of the mobile terminal, and improving use convenience and user experience.

Optionally, the step of determining according to the portrait or landscape state of the mobile terminal that the edge suppression is performed or no edge suppression is performed on the edge of the touch screen includes steps described below. When the mobile terminal is in the portrait state, it is determined that the edge suppression is performed on a left edge and a right edge of the touch screen. When the mobile terminal is in the landscape state, it is determined that no edge suppression is performed on the edge of the touch screen.

Optionally, the step of determining that the edge suppression is performed on the left edge and the right edge of the touch screen when the mobile terminal is in the portrait state includes at least one of steps described below. When the mobile terminal is in a single-screen portrait state, it is determined that the edge suppression is performed on the left edge and the right edge of the touch screen. When the mobile terminal is in a double-screen or multi-screen expansion portrait state, it is determined that the edge suppression is performed on the left edge and the right edge of the touch screen and no edge suppression is performed between adjacent display screens.

Optionally, the step of determining that the edge suppression is performed on the left edge and the right edge of the touch screen and no edge suppression is performed between the adjacent display screens when the mobile terminal is in the double-screen or multi-screen expansion portrait state includes a step described below. When the mobile terminal is in the double-screen expansion portrait state, it is determined that the edge suppression is performed on a left edge of a left touch screen and a right edge of a right touch screen and no edge suppression is performed on a right edge of the left touch screen and a left edge of the right touch screen. Alternatively, when the mobile terminal is in the multi-screen expansion portrait state, it is determined that the edge suppression is performed on a left edge of a leftmost touch screen and a right edge of a rightmost touch screen and no edge suppression is performed on a right edge of the leftmost touch screen, left and right edges of a middle screen and a left edge of the rightmost touch screen.

Optionally, the step of setting the edge suppression function of the touch screen according to the determination result includes steps described below. When the mobile terminal is in the single-screen portrait state, a touch screen configuration file for performing the edge suppression on the left edge and the right edge is sent through an I2C or an SPI bus to the touch screen. When the mobile terminal is in the double-screen or multi-screen expansion portrait state, a touch screen configuration file for performing the edge suppression on the left edge and the right edge and performing no edge suppression between the adjacent display screens is sent through the I2C or the SPI bus to the touch screen.

Optionally, the step of determining that no edge suppression is performed on the edge of the touch screen when the mobile terminal is in the landscape state includes steps described below. When the mobile terminal is in a single-screen landscape state, it is determined that no edge suppression is performed on the edge of the touch screen. When the mobile terminal is in a double-screen or multi-screen expansion landscape state, it is determined that no edge suppression is performed on the edge of the touch screen and no edge suppression is performed between adjacent display screens.

Optionally, the step of setting the edge suppression function of the touch screen according to the determination result includes steps described below. When the mobile terminal is in the single-screen landscape state, a touch screen configuration file for performing no edge suppression is sent through the I2C or the SPI bus to the touch screen. When the mobile terminal is in the double-screen or multi-screen expansion landscape state, a touch screen configuration file for performing no edge suppression on the edge of the touch screen and performing no edge suppression between the adjacent display screens is sent through the I2C or the SPI bus to the touch screen.

Optionally, the method further includes steps described below. The touch screen configuration file is read from a memory. The read touch screen configuration file is sent through the I2C or the SPI bus to an integrated circuit (IC) of the touch screen.

Optionally, the method further includes steps described below. It is detected whether a state of the touch screen of the mobile terminal changes. In a case where the state of the touch screen of the mobile terminal changes, an edge suppression region of the touch screen of the mobile terminal is changed according to a change condition of the state of the touch screen.

Optionally, the step of changing the edge suppression region of the touch screen of the mobile terminal according to the change condition of the state of the touch screen includes steps described below. In response to detecting that the touch screen changes from the portrait state to the landscape state, an edge suppression state of the touch screen is switched from the left edge and right edge suppression to no edge suppression. Alternatively, in response to detecting that the touch screen changes from the landscape state to the portrait state, an edge suppression state of the touch screen is switched from no edge suppression to the left edge and right edge suppression.

Optionally, the step of switching the edge suppression state of the touch screen from the left edge and right edge suppression to no edge suppression in response to detecting that the touch screen changes from the portrait state to the landscape state includes steps described below. In response to detecting that the touch screen changes from the single-screen portrait state to the single-screen landscape state, the edge suppression state of the touch screen is switched from the left edge and right edge suppression to no edge suppression. In response to detecting that the touch screen changes from the double-screen or multi-screen portrait state to the double-screen or multi-screen landscape state, the edge suppression state of the touch screen is switched from the state in which edge suppression is performed on the left edge and the right edge and no edge suppression is performed between the adjacent display screens to no edge suppression.

Optionally, the step of switching the edge suppression state of the touch screen from no edge suppression to the left edge and right edge suppression in response to detecting that the touch screen changes from the landscape state to the portrait state includes steps described below. In response to detecting that the touch screen changes from the single-screen landscape state to the single-screen portrait state, the edge suppression state of the touch screen is switched from no edge suppression to the left edge and right edge suppression. In response to detecting that the touch screen changes from the double-screen or multi-screen landscape state to the double-screen or multi-screen portrait state, the edge suppression state of the touch screen is switched from no edge suppression to the state in which the edge suppression is performed on the left edge and the right edge and no edge suppression is performed between the adjacent display screens.

Optionally, the method further includes steps described below. When the touch screen is in a double-screen or multi-screen state, a sliding instruction for sliding from a first display screen of the touch screen to an adjacent second display screen is detected. Reporting of a DOWN event of the first display screen and an UP event of the second display screen is triggered by the sliding instruction, where no edge suppression is performed between the first display screen and the second display screen.

Optionally, the step of detecting the current portrait or landscape state of the touch screen of the mobile terminal includes steps described below. For a single-screen mobile terminal, the current portrait or landscape state of the mobile terminal is detected through a three-axis acceleration sensor. For a double-screen or multi-screen mobile terminal, a portrait or landscape state of the double-screen or multi-screen mobile terminal is determined through Hall device automatic detection or a function key switching manner.

Figure 7:
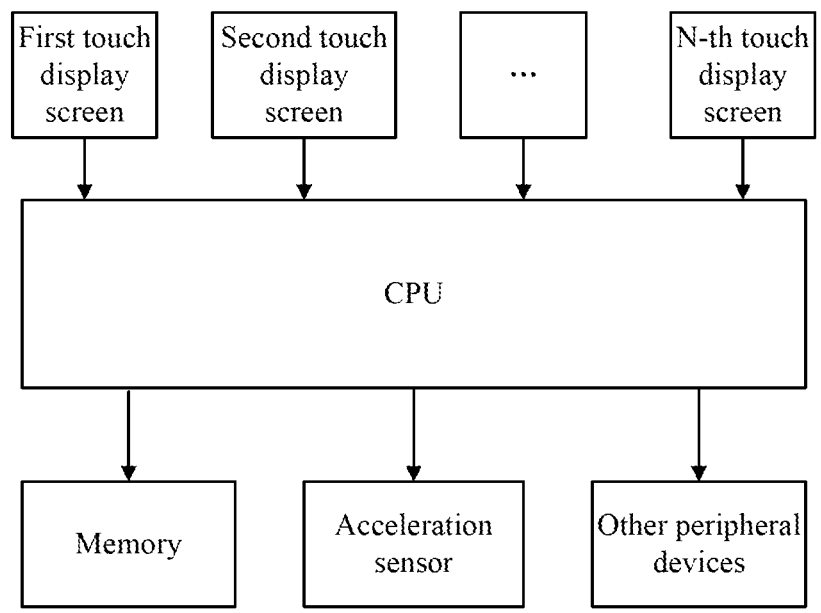
FIG. 7 is a schematic diagram of a multi-screen mobile terminal according to an embodiment of the present disclosure.

In order to solve an event of no response to touches caused by edge suppression of a touch screen in different operation scenarios, such as the problem of insensitive reactions and no response to touches on a top edge and a bottom edge when a single-screen mobile phone is operated in a landscape state, the problem of apparent disconnection and stuttering during a left-right cross-screen sliding operation process when a double-screen mobile phone is operated in a landscape state, and the problem of apparent disconnection and stuttering during a top-bottom cross-screen sliding operation process and insensitive touches and no response to touches on top and bottom edges when the double-screen mobile phone is operated in a portrait state, the embodiments of the present disclosure provide a method and an apparatus for flexibly processing edge suppression of a touch screen, so as to avoid frequent phenomena of no response to touches, disconnection and insensitive touches caused by the edge suppression during operation of the mobile terminal in the existing art, and improve the convenience for using an electronic apparatus and the user experience. A current portrait or landscape state of a mobile phone is automatically detected through acceleration. For a single-screen portrait display, a left side and a right side of a touch screen are edge suppression regions; during a single-screen landscape operation, no edge suppression is performed on a top region, a bottom region, a left region and a right region of the touch screen. FIG. 7 is a schematic diagram of a multi-screen mobile terminal according to an embodiment of the present disclosure. As shown in FIG. 7, a first touch display screen, a second touch display screen, . . . , and an N-th touch display screen are connected to a central processing unit (CPU) and work under the control of the CPU, and the multi-screen mobile terminal further includes a memory, an acceleration sensor and other peripherals. In response to a double-screen expansion portrait display, the edge suppression is performed on a left edge of a left touch screen and a right edge of a right touch screen and no edge suppression is performed on a right edge of the left touch screen and a left edge of the right touch screen. In response to a double-screen expansion landscape display, the edge suppression is not performed on top, bottom, left and right edges of a top touch screen and the edge suppression is not performed on top, bottom, left and right edges of a bottom touch screen.

The embodiments of the present disclosure provide a method for flexibly processing and setting edge suppression of a touch screen to eliminate the insensitive touches and no response to touches caused by the edge suppression of the touch screen in some scenarios. The method includes steps described below.

Figure 8:
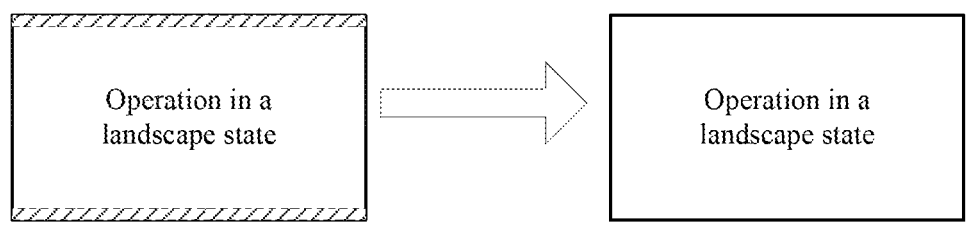
FIG. 8 is a schematic diagram of edge suppression performed for a single-screen mobile terminal in a landscape state according to an embodiment of the present disclosure.

In a first aspect, FIG. 8 is a schematic diagram of edge suppression performed for a single-screen mobile terminal in a landscape state according to an embodiment of the present disclosure. As shown in FIG. 8, when a mobile phone is in a single-screen working mode or is a single-screen mobile terminal, a portrait or landscape state of the mobile phone is determined according to an acceleration direction. When the mobile terminal works in the portrait state, a touch screen configuration file for performing the edge suppression on the left edge is sent to the touch screen by a processor through the I2C or the SPI bus. When the mobile terminal works in the landscape state, a touch screen configuration file for performing no edge suppression is sent to the touch screen by the processor through the I2C or the SPI bus.

In a second aspect, when the mobile phone is in a double-screen working mode, the portrait or landscape state of the mobile phone in the double-screen working mode is determined according to the acceleration direction.

Figure 9:
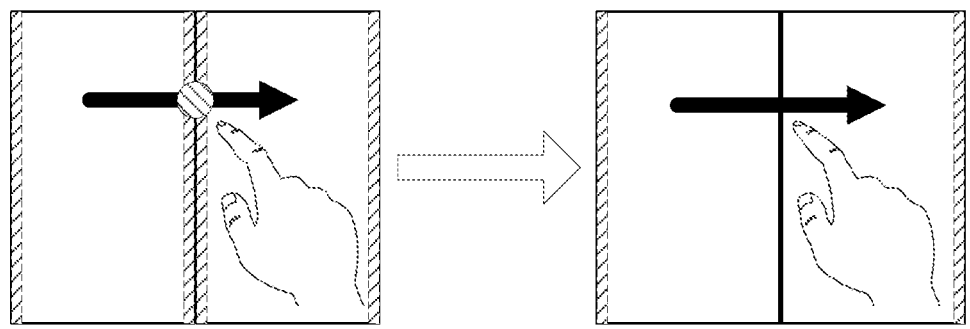
FIG. 9 is a schematic diagram of edge suppression performed for a double-screen mobile terminal in a portrait state according to an embodiment of the present disclosure.

FIG. 9 is a schematic diagram of edge suppression performed for a double-screen mobile terminal in a portrait state according to an embodiment of the present disclosure. As shown in FIG. 9, when the mobile terminal works in the portrait state, a touch screen configuration file for performing the edge suppression on the left edge and performing no edge suppression on the right edge is sent to the left touch screen by the processor through the I2C or the SPI bus, and a touch screen configuration file for performing no edge suppression on the left edge and the edge suppression on the right edge is sent to the right touch screen by the processor through the I2C or the SPI bus.

Figure 10:
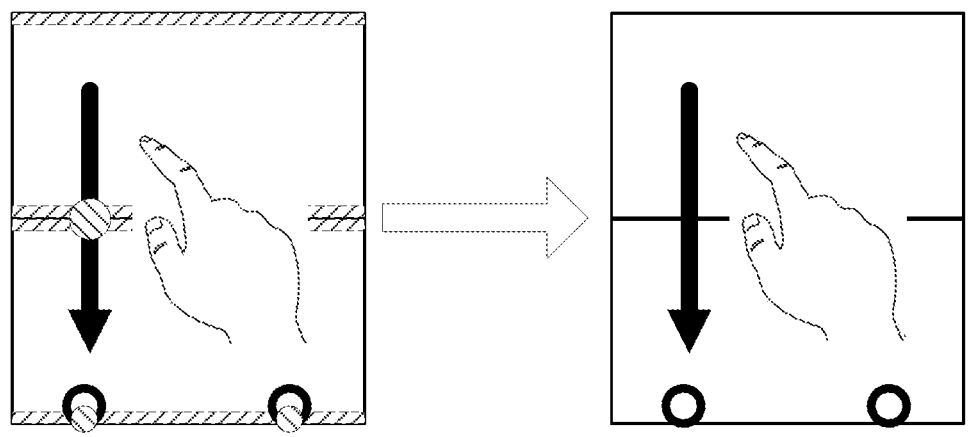
FIG. 10 is a schematic diagram of edge suppression performed for a double-screen mobile terminal in a landscape state according to an embodiment of the present disclosure.

FIG. 10 is a schematic diagram of edge suppression performed for a double-screen mobile terminal in a landscape state according to an embodiment of the present disclosure. As shown in FIG. 10, when the mobile terminal works in the landscape state, a touch screen configuration file for performing no edge suppression on the left edge and the right edge is sent to the top touch screen by the processor through the I2C or the SPI bus, and a touch screen configuration file for performing no edge suppression on the left edge and the right edge is sent to the bottom touch screen by the processor through the I2C or the SPI bus.

Figure 11:
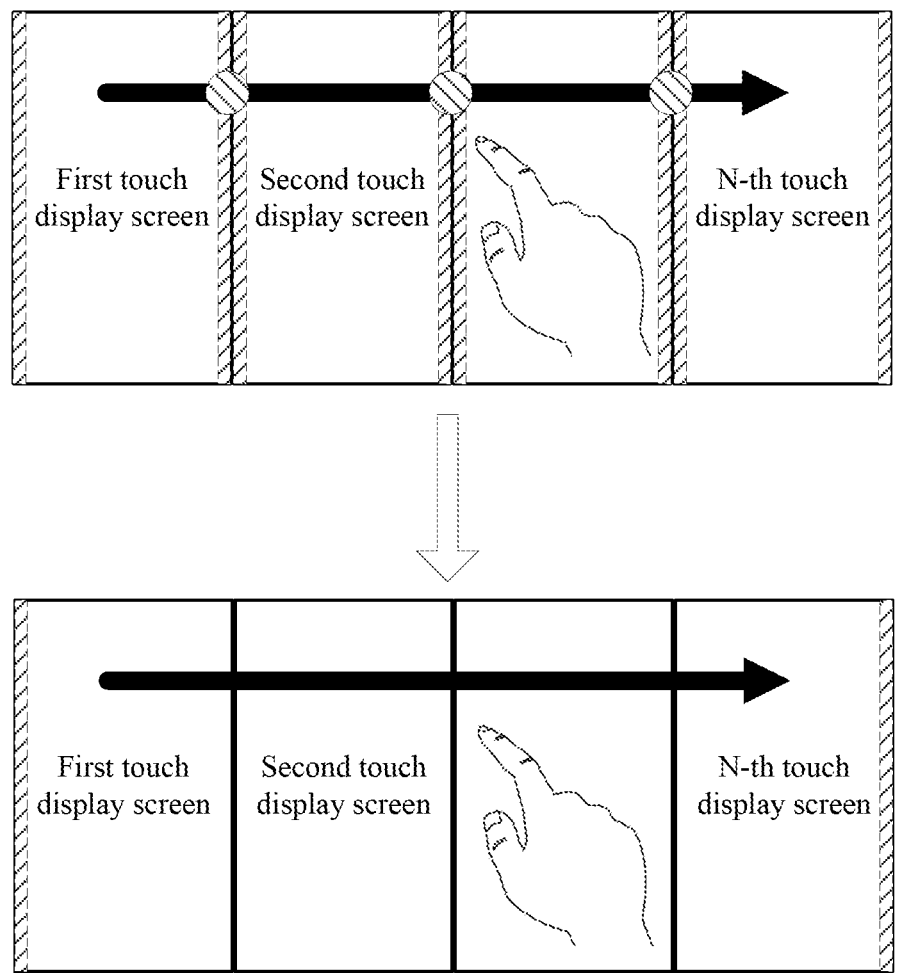
FIG. 11 is a first schematic diagram of edge suppression performed for a multi-screen mobile terminal in a portrait state according to an embodiment of the present disclosure.

FIG. 11 is a first schematic diagram of edge suppression performed for a multi-screen mobile terminal in a portrait state according to an embodiment of the present disclosure. As shown in FIG. 11, when the multi-screen mobile terminal works in the portrait state, a touch screen configuration file for performing the edge suppression on a left edge of the first touch display screen and performing the edge suppression on a right edge of the N-th touch display screen is sent to the left touch screen by the processor through the I2C or the SPI bus, and a touch screen configuration file for performing no edge suppression on a right edge of the first touch display screen and performing no edge suppression on a left edge of the N-th touch display screen and a touch screen configuration file for performing no edge suppression on left and right edges of the second touch display screen to an (N−1)-th touch display screen are sent by the processor through the I2C or the SPI bus.

Figure 12:
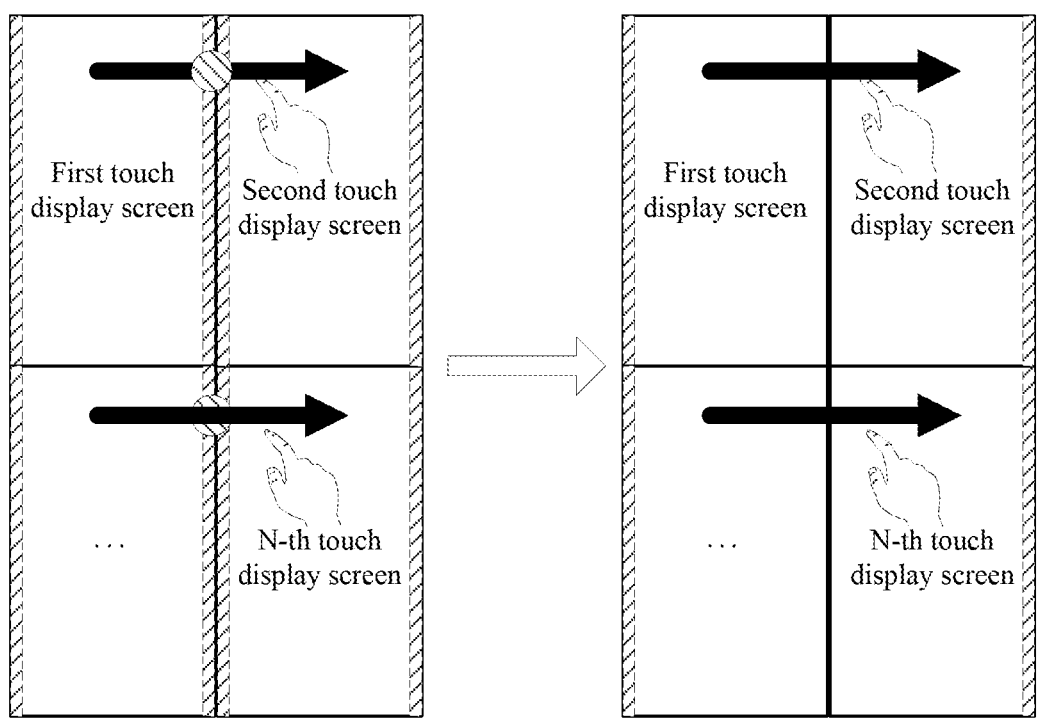
FIG. 12 is a second schematic diagram of edge suppression performed for a multi-screen mobile terminal in a portrait state according to an embodiment of the present disclosure.

FIG. 12 is a second schematic diagram of edge suppression performed for a multi-screen mobile terminal in a portrait state according to an embodiment of the present disclosure. As shown in FIG. 12, a touch screen configuration file for performing the edge suppression on the left edge and performing no edge suppression on the right edge is sent to a leftmost touch screen, a touch screen configuration file for performing no edge suppression on the left edge and the edge suppression on the right edge is sent to a rightmost touch screen, and a touch screen configuration file for performing no edge suppression on the left edge and the right edge is sent to a middle screen by the processor through the I2C or the SPI bus.

Figure 13:
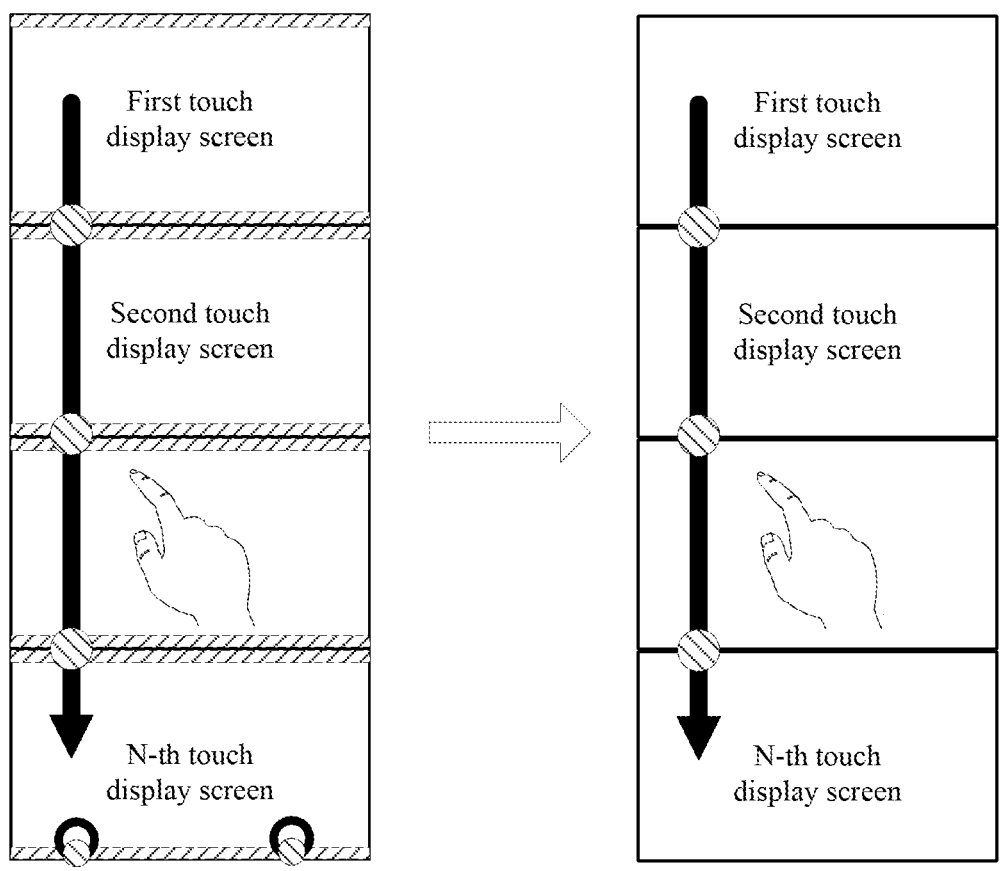
FIG. 13 is a first schematic diagram of edge suppression performed for a multi-screen mobile terminal in a landscape state according to an embodiment of the present disclosure.
Figure 14:
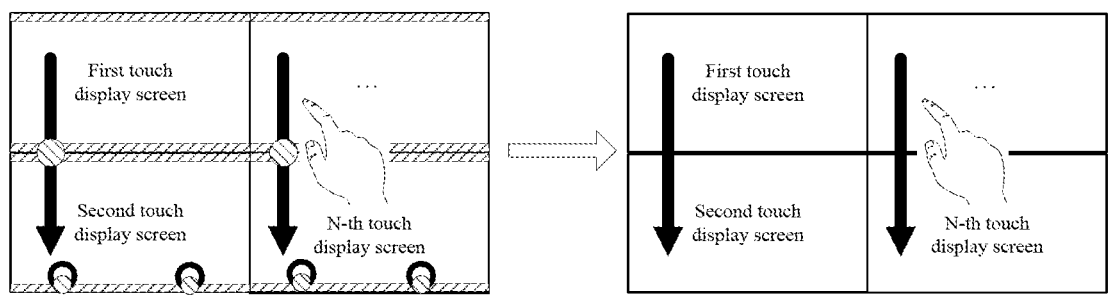
FIG. 14 is a second schematic diagram of edge suppression performed for a multi-screen mobile terminal in a landscape state according to an embodiment of the present disclosure.

FIG. 13 is a first schematic diagram of edge suppression performed for a multi-screen mobile terminal in a landscape state according to an embodiment of the present disclosure and FIG. 14 is a second schematic diagram of edge suppression performed for a multi-screen mobile terminal in a landscape state according to an embodiment of the present disclosure. As shown in FIG. 13 and FIG. 14, when the multi-screen mobile terminal works in the landscape state, a touch screen configuration file for performing no edge suppression on the top, bottom, left and right edges is sent to the first touch display screen to the N-th touch display screen by the processor through the I2C or the SPI bus. The problem that in response to a slide from top to bottom and a click on a top edge or a bottom edge, the bottom edge is difficult to touch, the normal operation such as the touch or the click is suppressed and there is no response to touches is solved.

For a cross-screen operation, when a finger slides from a certain screen to another screen, the touch screen firstly reports a Down event, reports an Up event when the finger slides out of a first screen, then reports a Down event when the finger slides into another screen, touch screen and reports an Up event again when the finger is finally lifted. That is to say, a complete process is as follows: when the finger continuously slides from a first display screen to a second display screen, the first display screen reports a Down event→the first display screen reports an Up event→the second display screen reports a Down event→the second display screen reports an Up event, where in the process in which the first display screen reports the Down event→the second display screen reports the Up event, disconnection exists. Generally, in order to handle the disconnection, delay determination is added, and if the Down event of the second display screen exists within a delay waiting time, the edge Up event of the first display screen is discarded to form a complete sliding operation.

If the solution that no edge suppression is performed on an edge between two connected screens is used, the setting of the delay waiting time may be decreased, and therefore the user experience is further improved.

Particularly, a current posture of the mobile phone may be calculated through a (x, y, z) value of a three-axis acceleration sensor. For example, an automatic rotation function of the current mobile phone is automatic switching of the portrait and landscape states by calculating an angle through the value of the acceleration sensor. For example, when the mobile phone is in the landscape state and parallel to the ground, three axes of the acceleration sensor have values (x=9.8 m/s^2, y=0, z=0) respectively.

Particularly, for the double-screen mobile phone, a working state of the double-screen mobile phone may be confirmed through Hall device automatic detection or a function key switching manner, where the working state includes a single-screen working mode and a double-screen working mode.

The single-screen working mode may refer to that merely the first display screen works or merely the second display screen works. An automatic adjustment manner of the edge suppression of the touch screen is suitable for both the first display screen and the second display screen.

Embodiment Two

Figure 15:
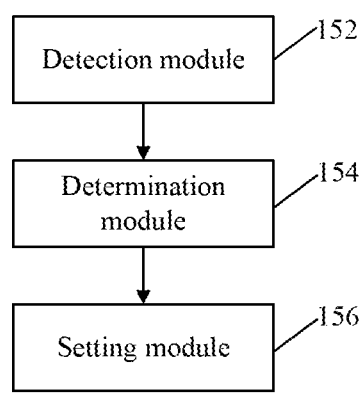
FIG. 15 is a block diagram of an apparatus for processing an edge of a touch screen according to an embodiment of the present disclosure.

Another embodiment of the present disclosure further provides an apparatus for processing an edge of a touch screen. FIG. 15 is a block diagram of an apparatus for processing an edge of a touch screen according to an embodiment of the present disclosure. As shown in FIG. 15, the apparatus includes a detection module 152, a determination module 154 and a setting module 156.

The detection module 152 is configured to detect a current portrait or landscape state of a touch screen of a mobile terminal.

The determination module 154 is configured to determine according to the portrait or landscape state of the mobile terminal that edge suppression is performed or no edge suppression is performed on the edge of the touch screen.

The setting module 156 is configured to set an edge suppression function of the touch screen according to a determination result.

Optionally, the determination module 154 includes a first determination unit and a second determination unit.

The first determination unit is configured to: when the mobile terminal is in the portrait state, determine that the edge suppression is performed on a left edge and a right edge of the touch screen.

The second determination unit is configured to: when the mobile terminal is in the landscape state, determine that no edge suppression is performed on the edge of the touch screen.

Optionally, the first determination unit includes at least one of: a first determination sub-module or a second determination sub-module.

The first determination sub-module is configured to: when the mobile terminal is in a single-screen portrait state, determine that the edge suppression is performed on the left edge and the right edge of the touch screen.

The second determination sub-module is configured to: when the mobile terminal is in a double-screen or multi-screen expansion portrait state, determine that the edge suppression is performed on the left edge and the right edge of the touch screen and no edge suppression is performed between adjacent display screens.

Optionally, the second determination sub-module is further configured to perform a step described below.

When the mobile terminal is in the double-screen expansion portrait state, the second determination sub-module determines that the edge suppression is performed on a left edge of a left touch screen and a right edge of a right touch screen and no edge suppression is performed on a right edge of the left touch screen and a left edge of the right touch screen.

Alternatively, when the mobile terminal is in the multi-screen expansion portrait state, the second determination sub-module determines that the edge suppression is performed on a left edge of a leftmost touch screen and a right edge of a rightmost touch screen and no edge suppression is performed on a right edge of the leftmost touch screen, left and right edges of a middle screen and a left edge of the rightmost touch screen.

Optionally, the setting module 156 includes a first sending unit and a second sending unit.

The first sending unit is configured to: when the mobile terminal is in the single-screen portrait state, send a touch screen configuration file for performing the edge suppression on the left edge and the right edge to the touch screen through an I2C or an SPI bus.

The second sending unit is configured to: when the mobile terminal is in the double-screen or multi-screen expansion portrait state, send a touch screen configuration file for performing the edge suppression on the left edge and the right edge and performing no edge suppression between the adjacent display screens to the touch screen through the I2C or the SPI bus.

Optionally, the second determination unit includes a third determination sub-unit and a fourth determination sub-unit.

The third determination sub-unit is configured to: when the mobile terminal is in a single-screen landscape state, determine that no edge suppression is performed on the edge of the touch screen.

The fourth determination sub-unit is configured to: when the mobile terminal is in a double-screen or multi-screen expansion landscape state, determine that no edge suppression is performed on the edge of the touch screen and no edge suppression is performed between adjacent display screens.

Optionally, the setting module 156 includes a third sending unit and a fourth sending unit.

The third sending unit is configured to: when the mobile terminal is in the single-screen landscape state, send a touch screen configuration file for performing no edge suppression to the touch screen through the I2C or the SPI bus.

The fourth sending unit is configured to: when the mobile terminal is in the double-screen or multi-screen expansion landscape state, send a touch screen configuration file for performing no edge suppression on the edge of the touch screen and no edge suppression between the adjacent display screens to the touch screen through the I2C or the SPI bus.

Optionally, the apparatus further includes an acquisition unit and a fifth sending unit.

The acquisition unit is configured to read the touch screen configuration file from a memory.

The fifth sending unit is configured to send the read touch screen configuration file to an IC of the touch screen through the I2C or the SPI bus.

Optionally, the apparatus further includes a change module.

The detection module is configured to detect whether a state of the touch screen of the mobile terminal changes.

The change module is configured to: in response to changing of the state of the touch screen of the mobile terminal, change an edge suppression region of the touch screen of the mobile terminal according to a change condition of the state of the touch screen.

Optionally, the change module includes a first switching unit or a second switching unit.

The first switching unit is configured to: in response to detecting that the touch screen changes from the portrait state to the landscape state, switch an edge suppression state of the touch screen from the left edge and right edge suppression to no edge suppression.

The second switching unit is configured to: in response to detecting that the touch screen changes from the landscape state to the portrait state, switch an edge suppression state of the touch screen from no edge suppression to the left edge and right edge suppression.

Optionally, the first switching unit is further configured to perform steps described below In response to detecting that the touch screen changes from the single-screen portrait state to the single-screen landscape state, switch the edge suppression state of the touch screen from the left edge and right edge suppression to no edge suppression.

In response to detecting that the touch screen changes from the double-screen or multi-screen portrait state to the double-screen or multi-screen landscape state, switch the edge suppression state of the touch screen from the state that the edge suppression is performed on the left edge and the right edge and no edge suppression is performed between the adjacent display screens to no edge suppression.

Optionally, the second switching unit is further configured to perform steps described below.

In response to detecting that the touch screen changes from the single-screen landscape state to the single-screen portrait state, the edge suppression state of the touch screen is switched from no edge suppression to the left edge and right edge suppression.

In response to detecting that the touch screen changes from the double-screen or multi-screen landscape state to the double-screen or multi-screen portrait state, the edge suppression state of the touch screen is switched from no edge suppression to the state that the edge suppression is performed on the left edge and the right edge and no edge suppression is performed between the adjacent display screens.

Optionally, the apparatus further includes a detection unit and a reporting unit.

The detection unit is configured to: when the touch screen is in a double-screen or multi-screen state, detect a sliding instruction for sliding from a first display screen of the touch screen to an adjacent second display screen.

The reporting unit is configured to report a DOWN event of the first display screen and an UP event of the second display screen when triggered by the sliding instruction, where no edge suppression is performed between the first display screen and the second display screen.

Optionally, the detection module 152 is further configured to perform steps described below.

For a single-screen mobile terminal, a current portrait or landscape state of the mobile terminal is detected through a three-axis acceleration sensor.

For a double-screen or multi-screen mobile terminal, a portrait or landscape state of the double-screen or multi-screen mobile terminal is determined through Hall device automatic detection or a function key switching manner.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

An embodiment of the present disclosure further provides a storage medium. The storage medium includes stored programs which, when executed, perform the method according to any one of the embodiments described above.

Optionally, in the present embodiment, the above-mentioned storage medium may be configured to store program codes for performing steps described below.

In S11, a current portrait or landscape state of a touch screen of a mobile terminal is detected.

In S12, it is determined according to the portrait or landscape state of the mobile terminal that edge suppression is performed or no edge suppression is performed on an edge of the touch screen.

In S13, an edge suppression function of the touch screen is set according to a determination result.

Optionally, in the present embodiment, the above-mentioned storage medium may include, but is not limited to, a USB flash disk, a read-only memory (ROM), a random access memory (RAM), a mobile hard disk, a magnetic disk, an optical disk or another medium capable of storing the program codes.

Embodiment Four

An embodiment of the present disclosure further provides a processor. The processor is configured to execute programs which, when executed, perform steps of the method according to any one of the embodiments described above.

Optionally, in the present embodiment, the programs described above are used for performing step described below.

In S21, a current portrait or landscape state of a touch screen of a mobile terminal is detected.

In S22, it is determined according to the portrait or landscape state of the mobile terminal that edge suppression is performed or no edge suppression is performed on the edge of the touch screen.

In S13, an edge suppression function of the touch screen is set according to a determination result.

Optionally, for specific examples in the present embodiment, reference may be made to the examples described in the above-mentioned embodiments and optional implementation manners, and repetition will not be made in the present embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of two computing apparatuses. Optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various IC modules separately, or two modules or steps therein may be made into a single IC module for implementation. In this way, the present disclosure is not limited to any specific combination of hardware and software.

The above are merely preferred embodiments of the present disclosure and are not intended to limit the present disclosure, and for those skilled in the art, the present disclosure may have various modifications and variations. Any modifications, equivalent substitutions, improvements and the like within the principle of the present disclosure should fall within the scope of the present disclosure.

What is claimed is:

1. A method for processing on edge of a touch screen, comprising:
    detecting a portrait or landscape state of a touch screen of a mobile terminal;

determining according to the portrait or landscape state of the mobile terminal that edge suppression is performed or no edge suppression is performed on the edge of the touch screen; and setting an edge suppression function of the touch screen according to a determination result;

the method further comprising:

when the touch screen is in a double-screen or multi-screen state, detecting a sliding instruction for sliding from a first display screen of the touch screen to an adjacent second display screen; and triggering, according to the sliding instruction, only reporting of a DOWN event of the first display screen and an UP event of the second display screen, wherein no edge suppression is performed between the first display screen and the second display screen.

2. The method of claim 1, wherein determining according to the portrait or landscape state of the mobile terminal that the edge suppression is performed or no edge suppression is performed on the edge of the touch screen comprises:

when the mobile terminal is in the portrait state, determining that the edge suppression is performed on a left edge and a right edge of the touch screen; and when the mobile terminal is in the landscape state, determining that no edge suppression is performed on the edge of the touch screen.

3. The method of claim 2, wherein when the mobile terminal is in the portrait state, determining that the edge suppression is performed on the left edge and the right edge of the touch screen comprises at least one of:

when the mobile terminal is in a single-screen portrait state, determining that the edge suppression is performed on the left edge and the right edge of the touch screen; or when the mobile terminal is in a double-screen or multi-screen expansion portrait state, determining that the edge suppression is performed on the left edge and the right edge of the touch screen and no edge suppression is performed between adjacent display screens.

4. The method of claim 3, wherein when the mobile terminal is in the double-screen or multi-screen expansion portrait state, determining that the edge suppression is performed on the left edge and the right edge of the touch screen and no edge suppression is performed between the adjacent display screens comprises:

when the mobile terminal is in the double-screen expansion portrait suite, determining that the edge suppression is performed on a left edge of a left touch screen and a right edge of a right touch screen and no edge suppression is performed on a right edge of the left touch screen and a left edge of the right touch screen; or when the mobile terminal is in the multi-screen expansion portrait state, determining that the edge suppression is performed on a left edge of a leftmost touch screen and a right edge of a rightmost touch screen and no edge suppression is performed on a right edge of the leftmost touch screen, left and right edges of a middle screen and a left edge of the rightmost touch screen.

5. The method of claim 3, wherein setting the edge suppression function of the touch screen according to the determination result comprises:

when the mobile terminal is in the single-screen portrait state, sending, through an inter-integrated circuit (I2C) or a serial peripheral interface (SPI) bus, a touch screen configuration file for performing the edge suppression on the left edge and the right edge to the touch screen; and when the mobile terminal is in the double-screen or multi-screen expansion portrait state, sending, through the I2C or the SPI bus, a touch screen configuration file for performing the edge suppression on the left edge and the right edge and performing no edge suppression between the adjacent display screens to the touch screen.

6. The method of claim 2, wherein when the mobile terminal is in the landscape slate, determining that no edge suppression is performed on the edge of the touch screen comprises;

when the mobile terminal is in a single-screen landscape state, determining that no edge suppression is performed on the edge of the touch screen; and when the mobile terminal is in a double-screen or multi-screen expansion landscape slate, determining that no edge suppression is performed on the edge of the touch screen and no edge suppression is performed between adjacent display screens.

7. The method of claim 6, wherein setting the edge suppression function of the touch screen according to the determination result comprises:

when the mobile terminal is in the single-screen landscape suite, sending, through an I2C or an SPI bus, a touch screen configuration file for performing no edge suppression to the touch screen; and when the mobile terminal is in the double-screen or multi-screen expansion landscape state, sending, through the I2C or the SPI bus, a touch screen configuration file for performing no edge suppression on the edge of the touch screen and no edge suppression between the adjacent display screens to the touch screen.

8. The method of claim 5, further comprising:

reading the touch screen configuration file from a memory; and sending, through the I2C or the SPI bus, the read touch screen configuration file to an integrated circuit (IC) of the touch screen.

9. The method of claim 1, further comprising:

detecting whether a state of the touch screen of the mobile terminal changes; and in a case where the stale of the touch screen of the mobile terminal changes, changing an edge suppression region of the touch screen of the mobile terminal according to a change condition of the state of the touch screen.

10. The method of claim 9, wherein changing the edge suppression region of the touch screen of the mobile terminal according to the change condition of the state of the touch screen comprises:

in response to detecting that the touch screen changes from the portrait suite to the landscape state, switching an edge suppression slate of the touch screen from the left edge and right edge suppression to no edge suppression; or in response to detecting that the touch screen changes from the landscape state to the portrait state, switching an edge suppression state of the touch screen from no edge suppression to the left edge and right edge suppression.

11. The method of claim 10, wherein in response to detecting that the touch screen changes from the portrait state to the landscape suite, switching the edge suppression state of the touch screen from the left edge and right edge suppression to no edge suppression comprises:
- in response to detecting that the touch screen changes from the single-screen portrait state to the single-screen landscape state, switching the edge suppression state of the touch screen from the left edge and right edge suppression to no edge suppression; and
- in response to detecting that the touch screen changes from the double-screen or multi-screen portrait state to the double-screen or multi-screen landscape state, switching the edge suppression state of the touch screen from the left edge and right edge suppression and no edge suppression between the adjacent display screens to no edge suppression.

12. The method of claim 10, wherein in response to detecting that the touch screen changes from the landscape state to the portrait state, switching the edge suppression state of the touch screen from no edge suppression to the left edge and right edge suppression comprises:
- in response to detecting that the touch screen changes from the single-screen landscape stale to the single-screen portrait state, switching the edge suppression state of the touch screen from no edge suppression to the left edge and right edge suppression; and
- in response to detecting that the touch screen changes from the double-screen or multi-screen landscape state to the double-screen or multi-screen portrait state, switching the edge suppression state of the touch screen from no edge suppression to the left edge and right edge suppression and no edge suppression between the adjacent display screens.

13. The method of claim 1, wherein detecting the portrait or landscape state of the touch screen of the mobile terminal comprises:
- for a single-screen mobile terminal, detecting a portrait or landscape suite of the mobile terminal through a three-axis acceleration sensor; and
- for a double-screen or multi-screen mobile terminal determining a portrait or landscape state of the double-screen or multi-screen mobile terminal through Hall device automatic detection or a function key switching manner.

14. A non-transitory storage medium, comprising stored programs which, when executed, perform a method for processing an edge of a touch screen, wherein the method composes:
- detecting a portrait or landscape state of a touch screen of a mobile terminal;
- determining according to the portrait or landscape stale of the mobile terminal that edge suppression is performed or no edge suppression is performed on the edge of the touch screen;
- setting an edge suppression function of the touch screen according to a determination result;
- when the touch screen is in a double-screen or multi-screen state, detecting a sliding instruction for sliding from a first display screen of the touch screen to an adjacent second display screen; and
- triggering, according to the sliding instruction, only reporting of a DOWN event of the first display screen and an UP event of the second display screen, wherein no edge suppression is performed between the first display screen and the second display screen.

15. The storage medium of claim 14, wherein determining according to the portrait or landscape stale of the mobile terminal that the edge suppression is performed or no edge suppression is performed on the edge of the touch screen comprises:
- when the mobile terminal is in the portrait state, determining that the edge suppression is performed on a left edge and a right edge of the touch screen; and
- when the mobile terminal is in the landscape state, determining that no edge suppression is performed on the edge of the touch screen.

16. The storage medium of claim 15, wherein when the mobile terminal is in the portrait state, determining that the edge suppression is performed on the left edge and the right edge of the touch screen comprises at least one of:
- when the mobile terminal is in a single-screen portrait state, determining that the edge suppression is performed on the left edge and the right edge of the touch screen; or
- when the mobile terminal is in a double-screen or multi-screen expansion portrait state, determining that the edge suppression is performed on the left edge and the right edge of the touch screen and no edge suppression is performed between adjacent display screens.

17. An apparatus for processing an edge of a touch screen, comprising: a processor and a memory for storing instructions executable by the processor, wherein execution of the instructions by the processor causes the processor to perform a method for processing an edge of a touch screen, wherein the method comprises:
- detecting a portrait or landscape state of a touch screen of a mobile terminal;
- determining according to the portrait or landscape suite of the mobile terminal that edge suppression is performed or no edge suppression is performed on the edge of the touch screen,
- setting an edge suppression function of the touch screen according to a determination result;
- when the much screen is in a double-screen or multi-screen state, detecting a sliding instruction for sliding from a first display screen of the touch screen to an adjacent second display screen; and
- triggering, according to the slid inn instruction, only reporting of a DOWN event of the first display screen and an UP event of the second display screen, wherein no edge suppression is performed between the first display screen and the second display screen.

18. The storage medium of claim 17, wherein determining according to the portrait or landscape state of the mobile terminal that the edge suppression is performed or no edge suppression is performed on the edge of the touch screen comprises:
- when the mobile terminal is in the portrait state, determining that the edge suppression is performed on a left edge and a right edge of the touch screen; and
- when the mobile terminal is m the landscape state, determining that no edge suppression is performed on the edge of the touch screen.

19. The storage medium of claim 18, wherein when the mobile terminal is in the portrait slate, determining that the edge suppression is performed on the left edge and the right edge of the touch screen comprises at least one of:
- when the mobile terminal is in a single-screen portrait state, determining that the edge suppression is performed on the left edge and the right edge of the touch screen; or when the mobile terminal is in a double-screen or multi-screen expansion portrait slate, determining that the edge suppression is performed on the left edge and the right edge of the touch screen and no edge suppression is performed between adjacent display screens.

* * * * *